United States Patent
Ananthapadmanabh et al.

(10) Patent No.: US 9,760,583 B2
(45) Date of Patent: *Sep. 12, 2017

(54) METHOD FOR NATIVE PROGRAM TO INHERIT SAME TRANSACTION CONTEXT WHEN INVOKED BY PRIMARY PROGRAM RUNNING IN SEPARATE ENVIRONMENT

(71) Applicant: International Business Machines Corporation, Armonk, NY (US)

(72) Inventors: Madhu B. Ananthapadmanabh, Bangalore (IN); John Kurian, Bangalore (IN); Ian J. Mitchell, Eastleigh (GB); Ajay Sood, Bangalore (IN); Hariharan Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 907 days.

This patent is subject to a terminal disclaimer.

(21) Appl. No.: 13/886,471

(22) Filed: May 3, 2013

(65) Prior Publication Data

US 2013/0246864 A1 Sep. 19, 2013

Related U.S. Application Data

(63) Continuation of application No. 13/172,825, filed on Jun. 30, 2011, now Pat. No. 9,449,030.

(51) Int. Cl.
*G06F 17/30* (2006.01)
*G06F 9/54* (2006.01)
*G06F 11/07* (2006.01)

(52) U.S. Cl.
CPC ........ *G06F 17/30283* (2013.01); *G06F 9/541* (2013.01); *G06F 11/0751* (2013.01); *G06F 17/30424* (2013.01)

(58) Field of Classification Search
CPC ............... G06F 17/30283; G06F 17/30424
See application file for complete search history.

(56) References Cited

U.S. PATENT DOCUMENTS 5,617,568 A 4/1997 Ault et al.
6,226,649 B1 * 5/2001 Bodamer .......... G06F 17/30427
707/722

(Continued)

FOREIGN PATENT DOCUMENTS

CN 1877579 A 12/2006
CN 101331489 A 12/2008

OTHER PUBLICATIONS

Miszczyk, Jarek, "Bridge the Legacy-to-Java Transition with DB2 for i5/OS Distributed Transactions", http://www.mcpressonline.com/database/db2/bridge-the-legacy-to-java-transition-with-db2-for-i5os-distributed-transactions.html, May 8, 2007, all pages.

(Continued)

*Primary Examiner* — James Trujillo
*Assistant Examiner* — Hubert Cheung
(74) *Attorney, Agent, or Firm* — North Shore Patents, P.C.; Lesley Leonessa

(57) ABSTRACT

Native applications inherit transaction contexts when invoked by primary applications running in separate hosting environments, by: receiving, by an interface of a native application server in a first hosting environment, a unique transaction context identifier for an invocation of the native application at the native application server by the primary application at a primary application server in a second hosting environment; receiving a SQL statement from the native application by the interface of the native application server; sending the SQL statement and the unique transaction context identifier to the primary application server for execution by the interface of the native application server; receiving a result of the execution of the SQL statement and (Continued)

the unique transaction context identifier from the primary application server by the interface of the native application server; and sending the result to the native application by the interface of the native application server.

11 Claims, 5 Drawing Sheets

(56) References Cited

U.S. PATENT DOCUMENTS

| | | | |
|---|---|---|---|
| 6,442,541 | B1 | 8/2002 | Clark et al. |
| 6,742,015 | B1 | 5/2004 | Bowman-Amuah |
| 2002/0188727 | A1 | 12/2002 | Lessard |
| 2004/0158813 | A1 | 8/2004 | Xia et al. |
| 2004/0249838 | A1 | 12/2004 | Hinshaw et al. |
| 2005/0033726 | A1 | 2/2005 | Wu et al. |
| 2005/0114285 | A1 | 5/2005 | Cincotta |
| 2006/0184931 | A1 | 8/2006 | Rochette et al. |
| 2009/0307230 | A1 | 12/2009 | Fujiyama et al. |
| 2010/0241731 | A1 | 9/2010 | Du et al. |
| 2010/0318989 | A1 | 12/2010 | Dureau et al. |
| 2010/0318997 | A1 | 12/2010 | Li et al. |
| 2011/0282914 | A1 | 11/2011 | Block et al. |
| 2012/0144388 | A1 | 6/2012 | Kurian et al. |
| 2012/0239802 | A1 | 9/2012 | Kitamura |
| 2012/0297237 | A1 | 11/2012 | Chatterjee et al. |

OTHER PUBLICATIONS

Fong, Pamela, "Asynchronous Processing in WebSphere Process Server", http://www.ibm.com/developerworks/websphere/library/techarticles/0904_fong/0904_fong.html, Apr. 29, 2009, all pages.

Kumar, Amiya, "Working with Transaction in Oracle Bpel", http://bpelknowledge.blogspot.com/2010/06/working-with-transaction-in-oracle-bpel.html, Jun. 26, 2010, all pages.

Seacord, Robert C. et al., "10.5 Solution of the Model Problem", http://learning.infocollections.com/ebook%202/Computer/Microsoft%20Technologies/General/Modernizing_Legacy_Systems/0321118847_ch10lev1sec5.html, Feb. 14, 2003, Section 10.5, all pages of section, Addison Wesley, USA.

Little, Mark et. al., "JBoss Enterprise Web Platform 5: Transactions JTA Development Guide", http://docs.redhat.com/docs/en-US/JBoss_Enterprise_Web_$_{Platform/5/html-single/Transactions}$_JTA_Development_Guide/index.html, May 10, 2010, all pages.

* cited by examiner

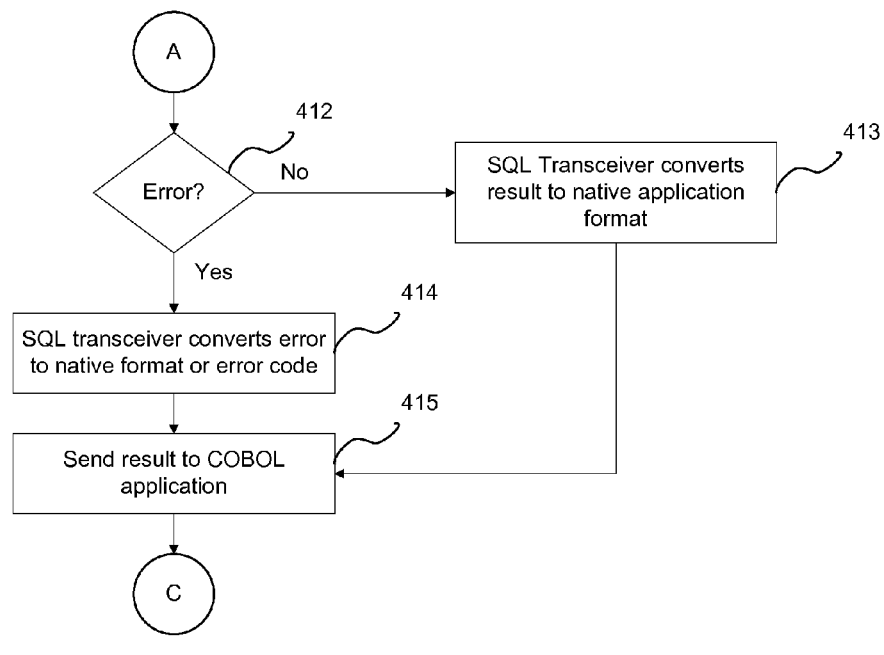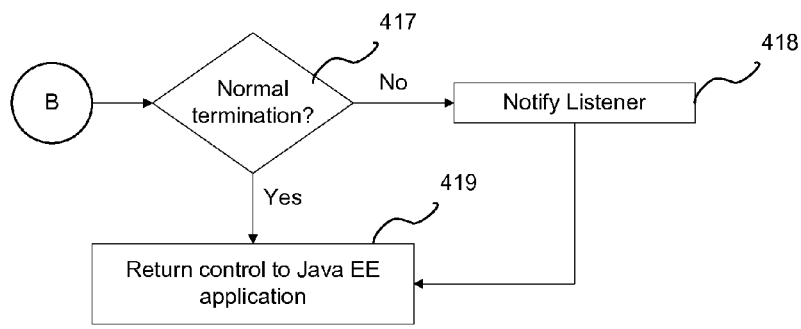
FIG. 4 (con't)

METHOD FOR NATIVE PROGRAM TO INHERIT SAME TRANSACTION CONTEXT WHEN INVOKED BY PRIMARY PROGRAM RUNNING IN SEPARATE ENVIRONMENT

CROSS-REFERENCE TO RELATED APPLICATIONS

The present application is a continuation of co-pending U.S. patent application Ser. No. 13/172,825, filed on Jun. 30, 2011 issued as U.S. Pat. No. 9,449,030.

BACKGROUND

Legacy COBOL applications containing embedded SQL statements typically run in mainframes or other hosted environments. For modernization, the legacy applications may be re- hosted within a Java EE application server based upon a Java Virtual Machine (JVM) environment. Such re-hosting may result in an enterprise application comprising of two disparate applications, with one written in a native language such as COBOL, and the other written in Java. For example, a Java application runs as a Java Enterprise Edition (EE) application in a Java EE compliant application server, such as a WebSphere Application Server (WAS), which runs in its own JVM process. The native program is hosted in a separate hosting environment, which runs as a native OS process outside the JVM process. The Java EE application functions as the transaction coordinator and invokes the native application. However, existing art does not invoke the native application within the same transaction context without requiring modification of the native application and uses separate database connections from the two environments. Using separate database connections from the two hosting environments can lead to deadlocks when the applications from the two hosting environments access the same database resource.

BRIEF SUMMARY

According to one embodiment of the present invention, a method for a native application to inherit a transaction context when invoked by a primary application running in a separate hosting environment, comprising: receiving, by an interface of a native application server in a first hosting environment, a unique transaction context identifier for an invocation of the native application at the native application server by the primary application at a primary application server in a second hosting environment; receiving a SQL statement from the native application by the interface of the native application server; sending the SQL statement and the unique transaction context identifier to the primary application server for execution by the interface of the native application server; receiving a result of the execution of the SQL statement and the unique transaction context identifier from the primary application server by the interface of the native application server; and sending the result to the native application by the interface of the native application server.

In one aspect of the present invention, the receiving the SQL statement from the native application by the interface of the native application server, further comprises: converting the SQL statement to a format of the second hosting environment by the interface of the native application server.

In one aspect of the present invention, the receiving the result of the execution of the SQL statement and the unique transaction context identifier from the primary application server by the interface of the native application server, further comprises: converting the result to a format of the first hosting environment by the interface of the native application server.

In one aspect of the present invention, the receiving, by the interface of the native application server in the first hosting environment, the unique transaction context identifier for the invocation of the native application at the native application server by the primary application at the primary application server in the second hosting environment, further comprises: invoking the native application by the primary application at the primary application server; transferring program control to the first hosting environment by the primary application server; and sending the unique transaction context identifier for the invocation to the interface of the native application server by the primary application server.

In one aspect of the present invention, the sending the SQL statement and the unique transaction context identifier to the primary application server for execution by the interface of the native application server, further comprises: receiving the SQL statement from the interface of the native application server by a second interface of the primary application server; delegating the execution of the SQL statement to a thread of the primary application server by the second interface of the primary application server; executing the SQL statement on a database and returning the result of the execution to the second interface by the thread of the primary application server; and returning the result of the execution of the SQL statement and the unique transaction context identifier to the interface of the native application server by the second interface of the primary application server.

In one aspect of the present invention, the receiving the result of the execution of the SQL statement and the unique transaction context identifier from the primary application server by the interface of the native application server, further comprises: determining, by the interface of the native application server, whether the result comprises an error in the execution of the SQL statement; and in response to determining that the result comprises the error, converting the error to a format of the first hosting environment by the interface of the native application server.

In one aspect of the present invention, further comprising: determining whether an execution of the native application has terminated by the interface of the native application server; in response to determining that the execution of the native application has terminated, determining whether the termination of the native application execution is normal by the interface of the native application server; and in response to determining that the termination of the native application execution is not normal, notifying the primary application server of the abnormal termination by the interface of the native application server.

System and computer program products corresponding to the above-summarized methods are also described and claimed herein.

DETAILED DESCRIPTION

Figure 1:
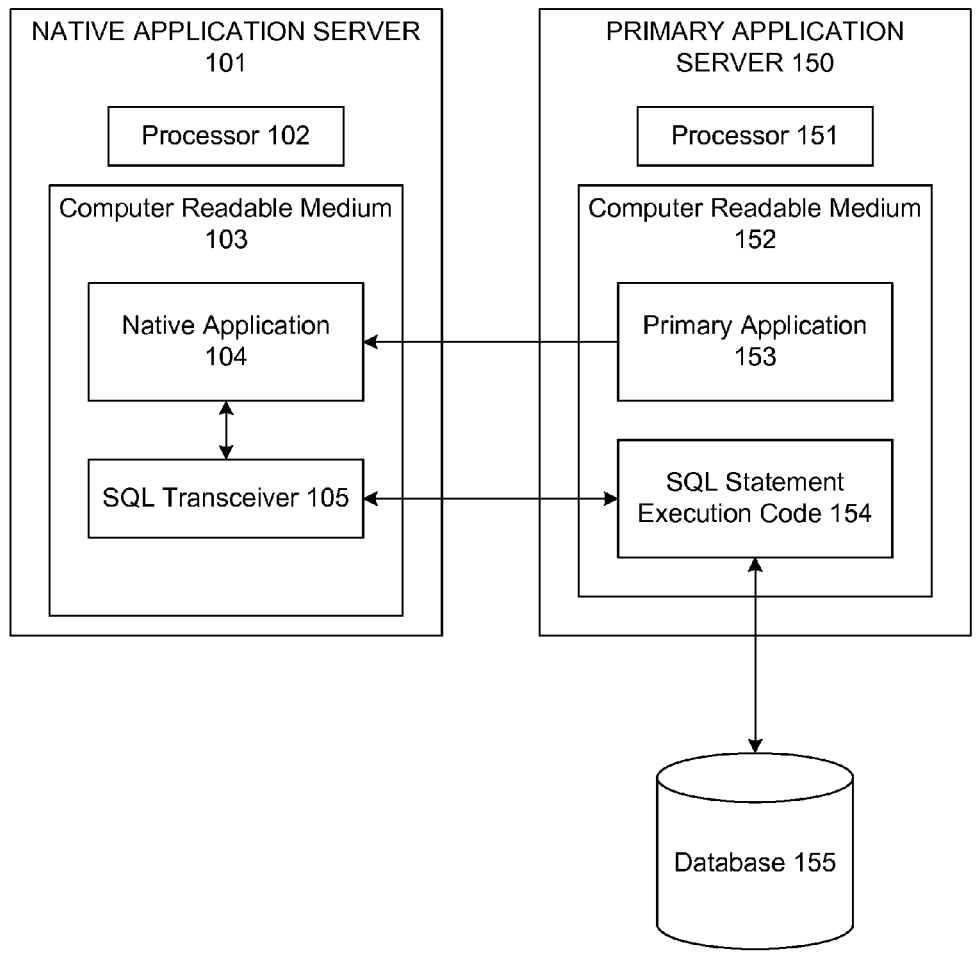
FIG. 1 illustrates an embodiment of a system for a native application to inherit the same transaction context when invoked by a primary application running in a separate hosting environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for a native application to inherit the same transaction context when invoked by a primary application running in a separate hosting environment. The system comprises a native application server 101, which is operationally coupled to a processor 102 and a computer readable medium 103. The computer readable medium 103 stores computer readable program code for implementing a native application 104 and a SQL transceiver 105 hosted in a first environment. The system further comprises a primary application server 150, which is operationally coupled to a processor 151 and a computer readable medium 152. The computer readable medium 152 stores computer readable program code for implementing a primary application 152 and SQL statement execution code 154, hosted in a second environment. The primary application server 150 acts as the primary transaction coordinator. The SQL transceiver 105 functions as an interface between the native application 104 and the primary application server 150, when embedded SQL statements in the native application 104 are to be executed in the hosting environment of the primary application server 150, such that the execution of the SQL statements inherits the same transaction context as the primary application 153 that invoked the native application 104, without a need to modify the compiled native application 104. The SQL statements are executed on the database 155 by the primary application server 150 by the SQL statement execution code 154. The processor 102 executes the program code stored in the computer readable media 103 and 152 according to the various embodiments of the present invention, as described further below.

Figure 2:
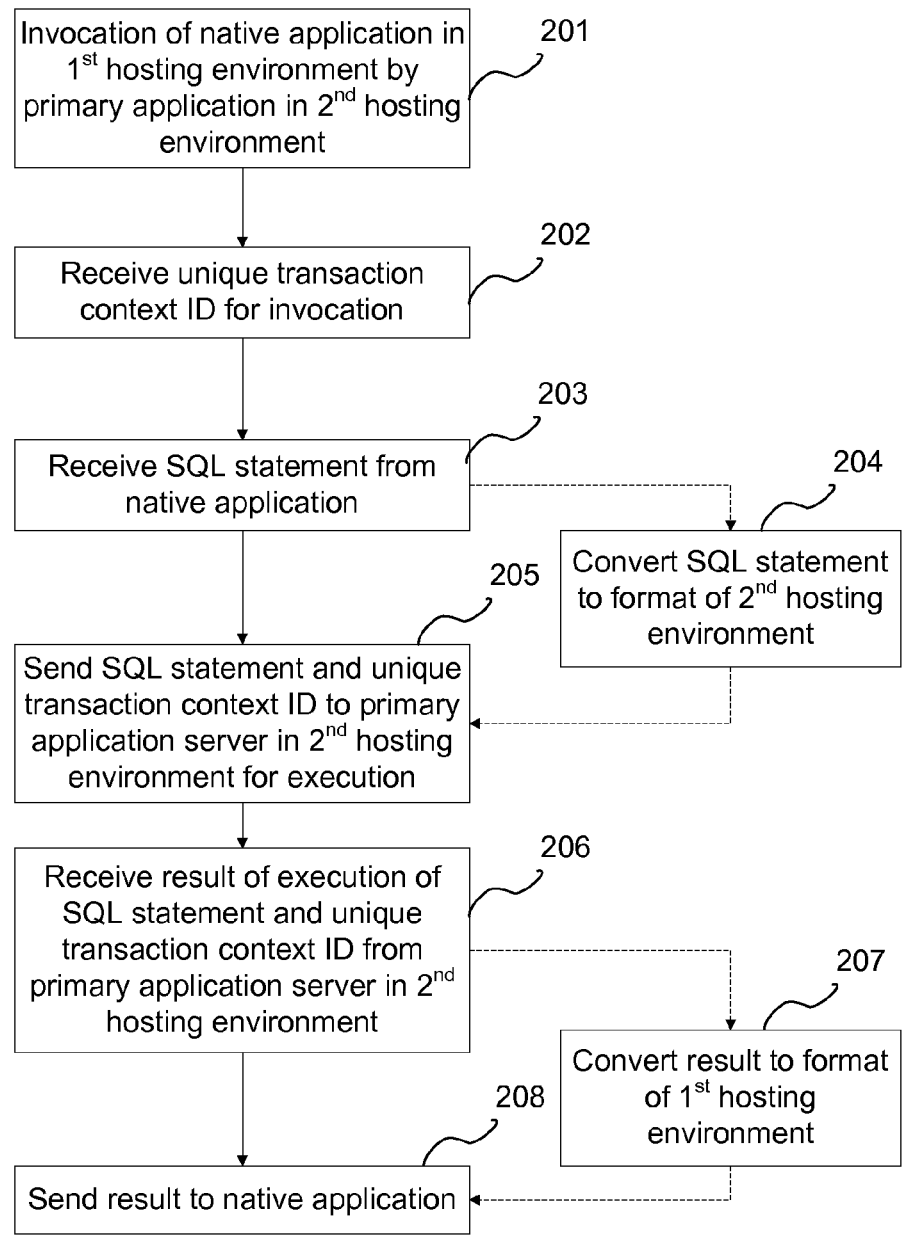
FIG. 2 is a flowchart illustrating an embodiment of a method for a native application to inherit the same transaction context when invoked by a primary application running in a separate environment according to the present invention.

FIG. 2 is a flowchart illustrating an embodiment of a method for a native application to inherit the same transaction context when invoked by a primary application running in a separate environment according to the present invention. Referring to both FIGS. 1 and 2, in response to the invocation of native application 104 of the first hosting environment by the primary application 153 in second hosting environment (201), the SQL transceiver 105 receives a unique transaction context identifier (ID) for the invocation (202). During the execution of the native application 104, the SQL transceiver 105 receives a SQL statement from the native application 104 (203). If necessary, the SQL transceiver 105 converts the SQL statement to a SQL format of the second hosting environment (204). The SQL transceiver 105 then sends the SQL statement and the unique transaction context ID to the primary application server 310 in the second hosting environment for execution (205). The SQL transceiver 105 and the native application 104 then wait for a response from the second hosting environment.

When the SQL transceiver 105 receives a result of the execution of the SQL statement, along with the unique transaction context ID, from the primary application server 310 (206), the SQL transceiver 105 converts the result to a format of the first hosting environment (207), if necessary, and sends the result to the native application 104 (208).

Figure 3:
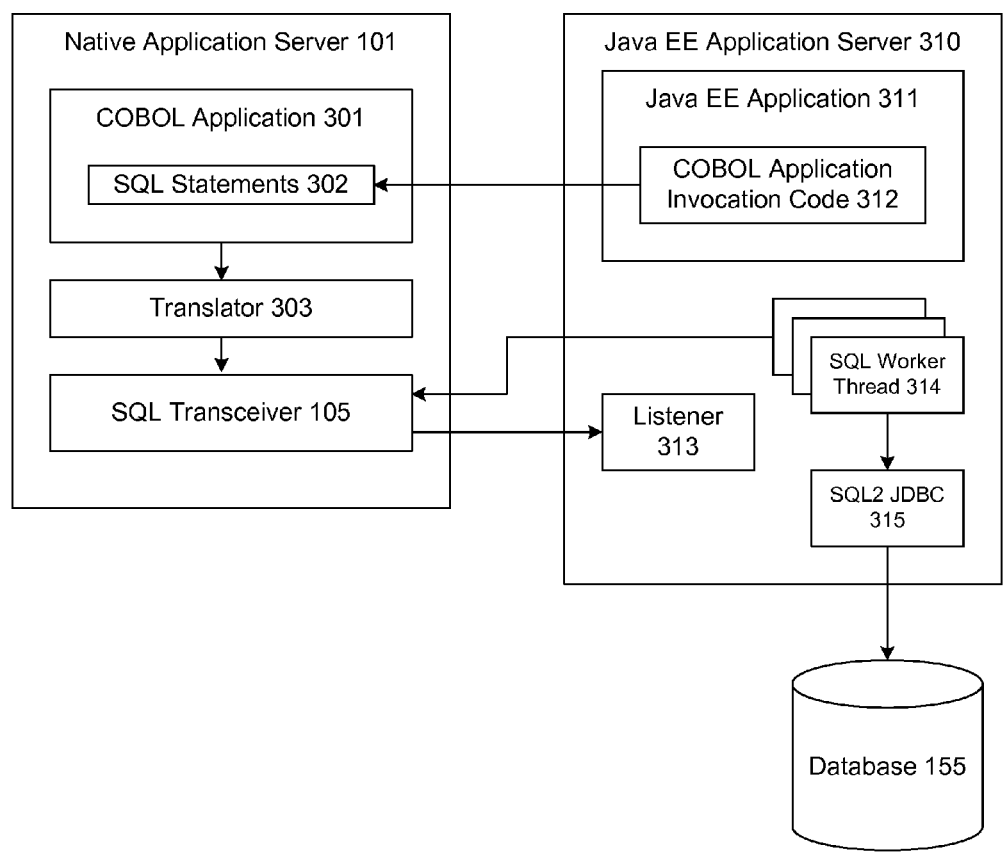
FIG. 3 illustrates an exemplary embodiment of the system for a native application to inherit the same transaction context when invoked by a primary application running in a separate environment.

FIG. 3 illustrates an exemplary embodiment of the system for a native application to inherit the same transaction context when invoked by a primary application running in a separate environment. In this exemplary embodiment, the native application server 101 hosts a native COBOL application 301 comprising embedded SQL statements 302 in a first environment. During a compilation phase, a translator 303 at the native application server 101 pre-compiles the COBOL source code to replace the embedded SQL statements 302 with code snippets calling the SQL transceiver 105. For example, assume the following embedded SQL statements are found in the COBOL source code:

```
EXEC SQL DECLARE C1 CURSOR FOR
    SELECT CHZCODE, AVLBL_QUANTITY
    FROM CHEESE
END-EXEC
```

The translator 303 replaces this code with the following:

```
MOVE "EXEC SQL DECLARE C1 CURSOR FOR
    SELECT CHZCODE, AVLBL_QUANTITY
    FROM CHEESE" CMD-BUFFER
CALL SQLTRANSRECV USING CMD-BUFFER,
``` where the 'SQLTRANSRECV' is a function implemented by the SQL transceiver 105, as described below.

The SQL transceiver 105 is responsible for transmitting the SQL statements from the native process at the native application server 101 to the JVM process at the Java EE application server 310 for execution. The SQL transceiver 105 is also responsible for receiving a result of the execution via an inter-process communication (IPC) mechanism, such as a socket, shared memory, or message queues. In one embodiment, the SQL transceiver 105 is a library that is link-edited with the COBOL application 301. Each COBOL application 301 in the system would have its own instances of the SQL transceiver 105.

Each SQL statement sent through the SQL transceiver 105 is identified with a unique transaction context ID. The status, result set, or errors of the SQL statement execution is identified with this unique transaction context ID. The unique transaction context ID is transmitted to the Java EE application server 310 as part of any data exchange related to the SQL statements. The SQL transceiver 105 would also perform any necessary data conversions across the Java EE and native applications. The SQL transceiver 105 further handles the error propagation, where the errors reported from within the Java EE application 311 are mapped accordingly to the native embedded SQL format or error codes.

The listener 313 comprises a thread running within the JAVA EE application server's JVM process, which continuously waits for the requests from the SQL transceiver 105. When a request from the SQL transceiver 105 is received by the listener 313, the listener 313 delegates the request to a JVM thread for execution of the SQL statement in the request. Optionally, the processing could also be routed to a separate child thread, spawned by the listener 313, called a SQL worker thread 314.

The SQL worker thread 314 comprises a dedicated thread to service a single invoked COBOL application 301, comprising multiple SQL statements. The beginning and end of the COBOL application 301 would be marked, and the SQL worker thread 314 would exclusively serve the COBOL application 301 until the invoked COBOL application 301 and its sub programs cease their execution. The SQL worker thread 314 shares its connection to the database 155 with the JAVA EE application thread which invoked the COBOL application 301, via the COBOL application invocation code 312.

The SQL worker thread 314 receives the SQL statements passed by the SQL transceiver 105 in a query string format, which may not be executed directly in the JAVA EE application server 310. If not, then the SQL-to-Java Database Connectivity (SQL2JDBC) component 315 converts the query to the equivalent JDBC calls, and the converted query is executed on the database 155 by the SQL worker thread 314.

Figure 4:
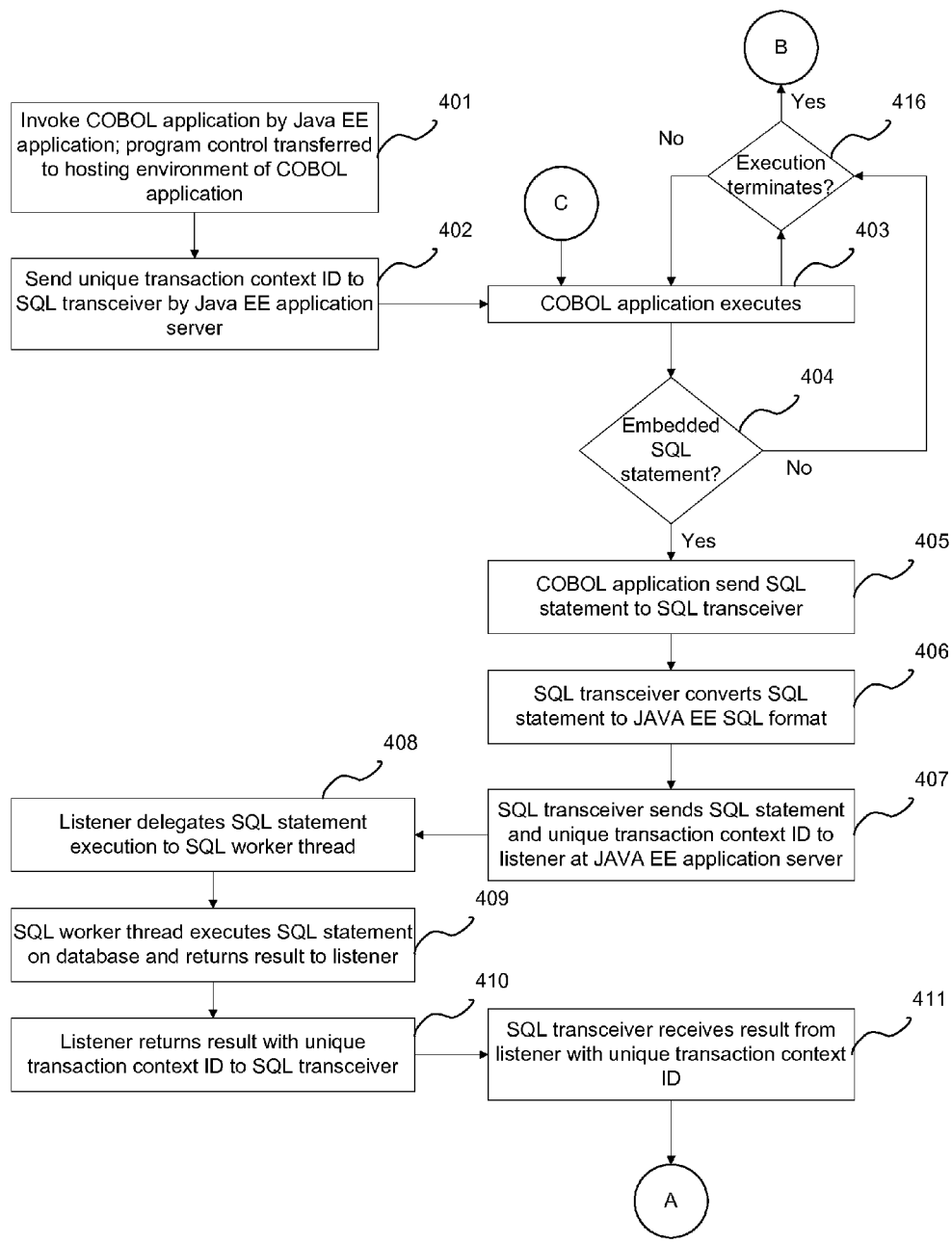
FIG. 4 is a flowchart illustrating in more detail the exemplary embodiment of the method for a native application to inherit the same transaction context when invoked by a primary application running in a separate environment according to the present invention.

FIG. 4 is a flowchart illustrating in more detail the exemplary embodiment of the method for a native application to inherit the same transaction context when invoked by a primary application running in a separate environment according to the present invention. Referring to both FIGS. 3 and 4, when the COBOL application 301 is invoked by the COBOL invocation code 312 of the Java EE application 311, program control is transferred to the hosting environment of the COBOL application 301 (401). The SQL transceiver 105 performs the initial handshake with the listener 313 and receives the unique transaction context ID for the invocation from the Java EE application server 310 (402). In response to the invocation, the COBOL application 301 executes (403). When the COBOL application 301 encounters an embedded SQL statement 302 (404), the COBOL application 301 sends the SQL statement to the SQL transceiver 106 (405). If necessary, the SQL transceiver 105 converts the SQL statement 302 to Java EE SQL format (406). The SQL transceiver 105 then sends the SQL statement 302 and the unique transaction context ID to the listener 313 at the Java EE application server 310 (407), along with any other relevant metadata. The SQL transceiver 105 and the COBOL application 301 then wait for a response from the listener 313.

In response to receiving the SQL statement 302 and the unique transaction context ID from the SQL transceiver 105, the listener 313 delegates the SQL statement execution to one of the SQL worker threads 314 (408). The SQL worker thread 314 executes the SQL statement 302, which may have been converted by the SQL SQL2JDBC component 315 as described above, on the database 155 and returns the result to the listener 313 (409). The listener 313 returns the result with the unique transaction context ID to the SQL transceiver 105 (410).

The SQL transceiver 105 receives the result from the listener 313 with the unique transaction context ID (411). The result is then checked to determine if the SQL execution was successful or had an error. If the result indicates an error (412), the SQL transceiver 105 converts the error to a native format or error code (414). Otherwise, the SQL transceiver 105 converts the result to a native application format (413). The result is then sent to the COBOL application 301 (415), and the execution of the COBOL application 301 continues (403).

When execution of the COBOL application 301 terminates (416), and the termination is normal (417), then the program control is returned to the Java EE application 311 (419). If there are exceptions, such as abnormal terminations of the COBOL application 301, the listener 313 is notified of a possible disconnect (418). Appropriate actions are then taken, and the program control is returned to the Java EE application 311.

In an embodiment, the method of the present invention is achieved in two phases, a compilation phase and a runtime phase. In the compilation phase, the translator 303 pre-compiles the COBOL application source code to insert the code snippet as explained above. The COBOL code snippet is then inputted to a COBOL compiler. The final compiled library is deployed in the hosting environment of the COBOL application 302.

Further, the JAVA EE application 311, which contains the COBOL application invocation code 312, is compiled and deployed on the JAVA EE Application server 310.

In the runtime phase, the JAVA EE application 311 invokes the COBOL application 301 through an interface call, such as a J2EE Connector Architecture (JCA) or Single Connector Attachment (SCA) interface call. Below is example Java EE application code comprising a COBOL application invocation:

```
1.     .....
2.     // Attempt to create a database connection
3.     String url = "jdbc:odbc:" + args[0];
4.     Connection firstConn = DriverManager.getConnection (url, "dba", "sql");
5.     .......
6.     ....
7.     // Invoke the COBOL program
8.     CobolRTS.callCobol("DBSEL.ibmcob", data_buffer);
9.     .......
10.    CobolRTS.callCobol("DBUPDT.ibmcob", data_buffer);
11.    ....
12.    // Commit the changes
13.    firstConn.commit( );
```

In this example, the invocation of the COBOL application 301 occurs at lines 8 and 10, at which points, the program control is transferred to the hosting environment where the COBOL application 301 runs, and the COBOL application 301 executes. The COBOL application 'DBSEL.ibmcob' in this example contains the EXEC SQL statements, which were translated to the appropriate code snippets during the pre-compilation by the translator 303, described above. When the execution comes to these code snippets, the COBOL application 301 contacts the SQL transceiver 105 and passes the embedded SQL statement 302 to the SQL transceiver 105.

The SQL transceiver 105 passes the SQL statement 302, along with the unique transaction context ID and any relevant metadata information, to the listener 313 through a pre-defined custom protocol, such as an IPC mechanism. The listener 313 had been waiting for SQL statements at the JAVA EE application server side.

The unique transaction context ID is generated in the Java EE application server 310 when a transaction context is established, and this unique transaction ID is given to the SQL transceiver 105 during the initial handshake request. The SQL transceiver 105 passes the unique transaction context ID for every SQL statement invoked within the native COBOL application 301.

The COBOL application 'DBUPDT.ibmcob', invoked at line 10, would use the same unique transaction context ID for the SQL statements executed within it. This ensures that both of the COBOL applications containing SQL statements have the same transaction context.

When the listener 313 delegates the SQL statement execution to a SQL worker thread 314, this thread takes the same database connection context as that of the invoking Java EE application 311, using the same unique transaction context ID. The result is propagated back to the SQL transceiver 105.

Although the embodiments above are described with a native COBOL application and a Java EE application environment, the method of the present invention may be used in other environment without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for a native application to inherit a transaction context when invoked by a primary application running in a separate hosting environment, comprising:

receiving an invocation of the native application to run at a native application server in a first hosting environment separate from a second hosting environment, the invocation initiated by the primary application running at a primary application server in the second hosting environment;

in response to the invocation, receive, by a query transceiver at the native application server, a unique transaction context identifier for the invocation, wherein the unique transaction context identifier is generated in the primary application server when a transaction context is established;

in response to encountering a query statement embedded in the native application during the execution of the native application, send the query statement from the native application to the query transceiver at the native application server;

send the query statement and the unique transaction context identifier from the query transceiver to the primary application server for execution on a database by the primary application server, wherein the database resides on the primary application server;

receive, by the query transceiver, a result of the execution of the query statement and the unique transaction context identifier from the primary application server;

send, by the query transceiver, the result to the native application; and wherein, the query statement embedded in the native application is executed on the database on the primary application server and the execution of the native application at the native application server in the first hosting environment are performed sharing the same database connection, and without modifying the native application, by passing the unique transaction context identifier along with the query statement, and passing the unique transaction context identifier along with the result of the execution of the query statement.

2. The method of claim 1, wherein the sending the query statement from the native application to the transceiver, further comprises:

converting the query statement to a format of the second hosting environment.

3. The method of claim 1, wherein the receiving the result of the execution of the query statement from the primary application server, further comprises:

converting the result to a format of the first hosting environment.

4. The method of claim 1, wherein the receiving, the invocation of the native application to run at the native application server in the first hosting environment from the primary application running at the primary application server in the second hosting environment, further comprises:

invoking the native application to run at the native application server in the first hosting environment by the primary application running at the primary application server in the second hosting environment;

transferring program control to the first hosting environment by the primary application server; and sending the unique transaction context identifier for the invocation to the native application server by the primary application server.

5. The method of claim 1, wherein the sending the query statement from the query transceiver to the primary application server for execution on the database by the primary application server, further comprises:

receiving the query statement by the primary application server;

delegating the execution of the query statement to a thread of the primary application server by the primary application server;

executing the query statement on a database by the thread; and returning the result of the execution of the query statement and the unique transaction context identifier to the native application server by the primary application server.

6. The method of claim 1, wherein the receiving the result of the execution of the query statement from the primary application server, further comprises:

determining, whether the result comprises an error in the execution of the query statement; and in response to determining that the result comprises the error, converting the error to a format of the first hosting environment.

7. The method of claim 1, further comprising:
determining whether an execution of the native application has terminated;
in response to determining that the execution of the native application has terminated, determining whether the termination of the native application execution is normal; and
in response to determining that the termination of the native application execution is not normal, notifying the primary application server of the abnormal termination.

8. A method for a native application to inherit a transaction context when invoked by a primary application running in a separate hosting environment, comprising:
receiving, by an interface of a native application server in a first hosting environment, a unique transaction context identifier for an invocation of the native application to run at the native application server in a first hosting environment separate from a second hosting environment, the invocation initiated by the primary application at a primary application server in the second hosting environment;
in response to the invocation, receiving a query statement from the native application by the interface of the native application server;
sending the query statement and the unique transaction context identifier to the primary application server for execution by the interface of the native application server;
in response to receiving the query statement from the interface of the native application server by a second interface of the primary application server, delegating the execution of the query statement to a thread of the primary application server by the second interface of the primary application server;
executing the query statement on a database on the primary application server and returning the result of the execution to the second interface by the thread of the primary application server, wherein the query statement embedded in the native application executed on the database on the primary application server and the execution of the native application at the native application server in the first hosting environment are performed sharing the same database connection, and without modifying the native application, by passing the unique transaction context identifier along with the query statement, and passing the unique transaction context identifier along with the result of the execution of the query statement;
returning the result of the execution of the query statement and the unique transaction context identifier to the interface of the native application server by the second interface of the primary application server; and
in response to receiving the result of the execution of the query statement and the unique transaction context identifier from the primary application server by the interface of the native application server, sending the result to the native application by the interface of the native application server.

9. The method of claim 8, wherein the receiving, by the interface of the native application server in the first hosting environment, the unique transaction context identifier for the invocation of the native application to run at the native application server in the first hosting environment separate from the second hosting environment, the invocation initiated by the primary application at the primary application server in the second hosting environment, further comprises:
invoking the native application by the primary application at the primary application server;
transferring program control to the first hosting environment by the primary application server; and
sending the unique transaction context identifier for the invocation to the interface of the native application server by the primary application server.

10. The method of claim 8, wherein the receiving the result of the execution of the query statement and the unique transaction context identifier from the primary application server by the interface of the native application server, further comprises:
determining, by the interface of the native application server, whether the result comprises an error in the execution of the query statement; and
in response to determining that the result comprises the error, converting the error to a format of the first hosting environment by the interface of the native application server.

11. The method of claim 8, further comprising: determining whether an execution of the native application has terminated by the interface of the native application server;
in response to determining that the execution of the native application has terminated, determining whether the termination of the native application execution is normal by the interface of the native application server; and
in response to determining that the termination of the native application execution is not normal, notifying the primary application server of the abnormal termination by the interface of the native application server.

* * * * *